United States Patent [19]
Talukder

[11] Patent Number: 5,952,458
[45] Date of Patent: Sep. 14, 1999

[54] PROCESS FOR PREPARING A VINYL TERMINATED POLYMER

[75] Inventor: Mostafa A. H. Talukder, Ridgecrest, Calif.

[73] Assignee: The Government of the United States as represented by the Secretary of the Navy, Washington, D.C.

[21] Appl. No.: 09/168,332

[22] Filed: Sep. 24, 1998

Related U.S. Application Data

[62] Division of application No. 08/871,664, Jun. 9, 1997, Pat. No. 5,892,607.

[51] Int. Cl.$^6$ ............................ C08G 59/68; C08G 65/04
[52] U.S. Cl. ...................... 528/409; 528/408; 528/410; 528/411; 528/416; 560/172; 560/191; 560/202; 560/205; 560/209; 560/218; 560/240; 560/248
[58] Field of Search .................................. 528/408, 409, 528/410, 411, 416; 560/172, 191, 202, 205, 209, 218, 240, 248

[56] References Cited

U.S. PATENT DOCUMENTS

| | | | |
|---|---|---|---|
| 2,819,296 | 1/1958 | Carnes et al. | 260/486 |
| 3,150,167 | 9/1964 | Wright et al. | 260/486 |

*Primary Examiner*—Frederick Krass
*Attorney, Agent, or Firm*—Gregory M. Bokar; Davis S. Kalmhbaugh

[57] ABSTRACT

Synthesis of a vinyl terminated polymer by reacting a cationically polymerizable monomer in the form of a cyclic ether with an acid chloride in a suitable solvent and in the presence of a Lewis acid. The vinyl-terminated polymers can be polymerized with other appropriate monomers resulting in thermoplastic elastomers having suitable properties for use as binders for explosives and propellants.

8 Claims, No Drawings

PROCESS FOR PREPARING A VINYL TERMINATED POLYMER

CROSS-REFERENCE TO RELATED APPLICATION

This application is being filed as a Divisional application in accordance with 37 C.F.R. 1.53(b). The Parent application of this Divisional is application Ser. No. 08/871,664 filed Jun. 9, 1997, now U.S. Pat. No. 5,892,607. +gi

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

This invention relates to the preparation of vinyl terminated polymers, and in particular to the production of vinyl terminated polymers capable of polymerization with appropriate monomers to provide thermoplastic elastomers useful as binders for explosives and propellants.

2. Description of the Prior Art

Solid propellants are formulated from an oxidizer and fuel, together with suitable binders and plasticizers to impart physical integrity. Most highly energetic systems utilize binders and plasticizers containing energetic groups such as nitro, azido and others. These binders impart additional energy to explosives and propellants.

Thermoplastic elastomers have the properties of conventional rubber. They do not require curing or vulcanization. Instead, they are readily fabricated by melt processing techniques, such as injection molding or extrusion. While many thermoplastic elastomers are commercially available on the market, the specific properties of such elastomers for use as binders for explosives and propellants are generally inadequate. It is desirable to provide suitable thermoplastic elastomers having a melting point sufficiently low to permit safe processing with explosives when used as binders.

BRIEF SUMMARY OF THE INVENTION

One object of the invention is to prepare vinyl terminated polymers.

Another object of the invention is the preparation of vinyl terminated polymers from monomers containing energetic groups. These polymers are useful in the preparation of binders for explosives and propellants.

Yet another object of the invention is to provide thermoplastic elastomers in the form of vinyl terminated polymers which are capable of polymerization with another appropriate monomer to provide thermoplastic elastomers useful as binders for propellants and explosives.

A vinyl terminated polymer is prepared by reacting a cationically polymerizable monomer, in the form of a cyclic ether containing 2 to 5 ring carbon atoms (e.g. bis (azidomethyl) oxetane), with an acid chloride (e.g. methacryloyl chloride) in a suitable solvent and in the presence of a Lewis acid (e.g. silver hexafluoroantimonate).

The resulting vinyl-terminated polymer can be polymerized with another appropriate monomer (e.g. butyl acrylate) to give thermoplastic elastomers having suitable properties for use as binders for explosives and propellants.

DETAILED DESCRIPTION OF THE INVENTION

The reaction for producing a vinyl-terminated polymer by reaction of a cationically polymerizable monomer with a vinyl group-containing acid chloride in the presence of a Lewis acid is as follows:

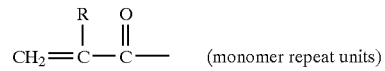

where R can be hydrogen or an alkyl.

Cationic monomers that can be employed in the reaction are cyclic ethers, including cyclic ethers which comprise an oxirane ring, an oxetane ring or the furan ring. Specific examples of these ethers are as follows:

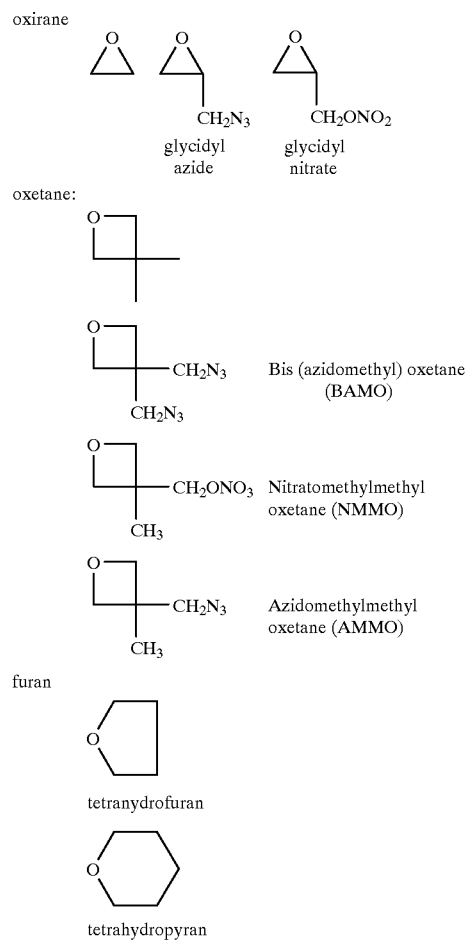

Vinyl-containing acid chlorides which can be employed include, acryloyl chloride and methacryloyl chloride.

Lewis acids employed in carrying out the reaction can include silver hexafluoroantimonate (AgSbF$_6$), silver hexafluorophosphate (AgPF6), aluminum halides, titanium halides, boron trihalides and vanadium tetrachloride, VCl$_4$.

The above cyclic ethers are cationically polymerized by reaction with a vinyl-containing acid chloride in the presence of a Lewis acid in a suitable solvent. Some of the solvents which can be employed include methylene chloride, benzene, toluene, hexane, heptane and cyclohexane.

The ratio of a cyclic ether monomer to acid chloride is generally about equimolar, but such proportions can be varied. The reaction is carried out at reduced temperatures, from about −75° C. to about −100° C., employing suitable cooling means such as liquid nitrogen or a dry ice-methanol bath. The ring of the cyclic ether opens up to form a polyether with a vinyl-containing terminal group, e.g. acryloyl, at one end, and terminal groups such as OH at the opposite end. The Lewis acid functions both as an initiator and as a catalyst.

The solvent amount can range from about 1–100 ml. The higher the number of methylene groups in the cyclic ether the slower the reaction. The substituent groups on the cyclic ether play no part in the reaction. The Lewis acid forms a negative or counter-ion in the reaction and is converted to AgI.

When carrying out the reaction, a mixture of cationically polymerizable cyclic ether monomer, a vinyl group-containing acid chloride and a solvent are taken in a reactor equipped with a thermocouple, a nitrogen inlet-out system, and a magnetic stirrer. The mixture is cooled using liquid nitrogen. A solution of Lewis acid is added to the reactor. The cooling bath of liquid nitrogen is replaced with a dry ice methanol bath. The temperature of the reactor is slowly allowed to reach −78° C. where the polymerization is allowed to continue for a few hours. The reaction is terminated by the addition of methanol (MeOH). The whole mixture is transferred to a separation funnel. After separation, a vinyl terminated polymer results. NMR testing of the monomer, acid chloride and the polymer confirmed the structural assignment of the polymer.

The resulting vinyl terminated polymer has the formula:

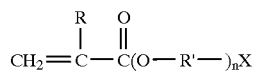

where R is selected from the group consisting of hydrogen and an alkyl; R' is an unsubstituted or substituted hydrocarbon chain preferably containing from 2 to 5 carbon atoms; n is an integer ranging from about 2 to about 100; and X is selected from the group consisting of hydroxy, methoxy and any other alkoxy.

The following are specific examples of the synthesis of a vinyl terminated polymer according to the invention:

EXAMPLE 1

A mixture of 1.0083 g bis(azidomethyl)oxetane (BAMO), 0.29 g methacryloyl chloride (MC) and 2 ml $CH_2Cl_2$ were combined in a reactor tube equipped with a thermocouple, a dry nitrogen inlet, a delivery tube and a magnetic stirrer. The mixture was cooled to about −100° C. using a liquid nitrogen bath. A solution of 0.5330 g silver hexafluoroantimonate in 2 ml $CH_2Cl_2$ was added to the mixture The liquid nitrogen bath was replaced with a dry-ice methanol bath and the temperature was allowed to slowly reach −78° C. The polymerization was continued for 1½ hours at −78° C. The reaction was terminated with 0.5 ml MeOH. The content of the reactor was transferred to a separation funnel, and treated with concentrated $NH_4OH$. The organic layer was separated, dried, filtered, concentrated and washed with MeOH to give a white powdery material. NMR confirmed the vinyl terminal group of the polymer. The assignments of the different peaks of the polymer are as follows:

1.9 ppm (—$CH_3$), 6.1 ppm and 5.6 ppm ($CH_2$=), and 3.3 ppm (PolyBAMO).

EXAMPLE 2

The procedure of Example 1 is essentially repeated. However, instead of using BAMO a cyclic ether is used in its place along with an equivalent amount of nitratomethyl methyl oxetane (NMMO). The resultant product is a vinyl terminated polymer similar to that of Example 1.

EXAMPLE 3

The procedure of Example 1 is essentially repeated. However, instead of using BAMO a cyclic ether is used in its place along with an equivalent amount of azidomethyl methyl oxetane (AMMO). The resultant product is a vinyl terminated polymer similar to that of Example 1.

The vinyl terminated polymers of the invention can be copolymerized with another appropriate monomer to give thermoplastic elastomers useful as binders for explosives and propellants. Another appropriate monomer can be butyl acrylate or ethyl hexyl acrylate, wherein a vinyl group of such acrylates is polymerized with a vinyl terminal group of the polymer hereof, to provide a cross-linked copolymer. The resulting copolymer is a thermoplastic elastomer having a main backbone chain formed of opened and attached vinyl groups, forming a soft segment, with pendant groups, such as BAMO, methyl methyl oxetane (MMO) or AMMO pendant groups, forming hard segments.

The invention provides for the synthesis of vinyl terminated polymers by a relatively simple procedure. The polymers can contain energetic groups (e.g. azido groups) and are capable of polymerization with monomers containing vinyl groups to produce cross-linked thermoplastic elastomers. These elastomers in turn may function as binders for explosives and propellants.

What is claimed is:

1. A process for preparing a vinyl terminated polymer, comprising the steps of:

reacting a cationically polymerizable monomer comprising a cyclic ether containing from 2 to 5 ring carbon atoms in a solvent and in the presence of a Lewis acid, with an acid chloride selected from the group consisting of acryloyl chloride and methacryloyl chloride at a temperature of from about 75 degrees Celsius to about 100 degrees Celsius; and recovering a vinyl terminated polymer.

2. The process of claim 1, wherein said cyclic ether is an oxirane.

3. The process of claim 1, wherein said cyclic ether is an oxetane.

4. The process of claim 1, wherein said cyclic ether is a furan.

5. The process of claim 1, wherein said cyclic ether is bis(azidomethyl)oxetane.

6. The process of claim 1, wherein said cyclic ether is nitratomethyl methyl oxetane.

7. The process of claim 1, wherein said cyclic ether is azidomethyl methyl oxetane.

8. The process of claim 1, wherein said Lewis acid is selected from the group consisting of silver hexafluoroantimonate, an aluminum halide, a titanium halide, a boron trihalide and vanadium tetrachloride.

* * * * *